United States Patent [19]
Koht et al.

[11] Patent Number: 5,090,792
[45] Date of Patent: Feb. 25, 1992

[54] OPTICAL FIBER TAP HANDLING TRAY

[75] Inventors: Lowell I. Koht, Foster City; Donald Del Fava, San Carlos; Brian H. Clark, Sunnyvale; Dana M. Takaki, San Jose; George W. Haddock, Menlo Park, all of Calif.

[73] Assignee: Raynet Corporation, Menlo Park, Calif.

[21] Appl. No.: 523,169

[22] Filed: May 11, 1990

Related U.S. Application Data

[63] Continuation of Ser. No. 344,778, Apr. 28, 1989, Pat. No. 5,002,356.

[51] Int. Cl.⁵ .............................................. G02B 6/36
[52] U.S. Cl. .................................... 385/32; 385/135; 385/53
[58] Field of Search ............... 350/96.20, 96.21, 96.15, 350/96.16

[56] References Cited

U.S. PATENT DOCUMENTS

| | | | |
|---|---|---|---|
| 4,650,278 | 3/1987 | Maciejko et al. | 350/96.20 |
| 4,983,008 | 1/1991 | Campbell | 350/96.16 |
| 5,002,356 | 3/1991 | Koht et al. | 350/96.20 |

FOREIGN PATENT DOCUMENTS

| | | | |
|---|---|---|---|
| 3033928 | 3/1982 | Fed. Rep. of Germany | 350/96.20 |
| 3413401 | 10/1985 | Fed. Rep. of Germany | 350/96.20 |
| 59-15210 | 1/1984 | Japan | 350/96.23 |

Primary Examiner—Frank Gonzalez

[57] ABSTRACT

An optical fiber waveguide tap handling tray is provided for use with a cable containing a plurality of optical fiber waveguides which are separated from the cable and exposed in a section thereof. The tap handling tray comprises a frame, a clamp for clamping the cable to the frame adjacent the section thereof so that the exposed optical fiber waveguides are thereupon physically secured to and contained within the frame, at least one optical tap secured to the frame for engaging and bending at least one of the plurality of optical fiber waveguides against an optical coupling medium having an index of refraction selected to match the index of refraction of the optical fiber so that light energy may pass through a side of the optical fiber and through the optical coupling medium, and wherein the optical tap defines an obtuse guiding angle arranged to lie in a path with which the fiber may freely be aligned within the frame after the cable has been clamped thereto. Taps having differing obtuse guiding angles may be selectively installed by the craftsman within the tray in order to select a desired amount of light energy interchange at the tap field location.

12 Claims, 12 Drawing Sheets

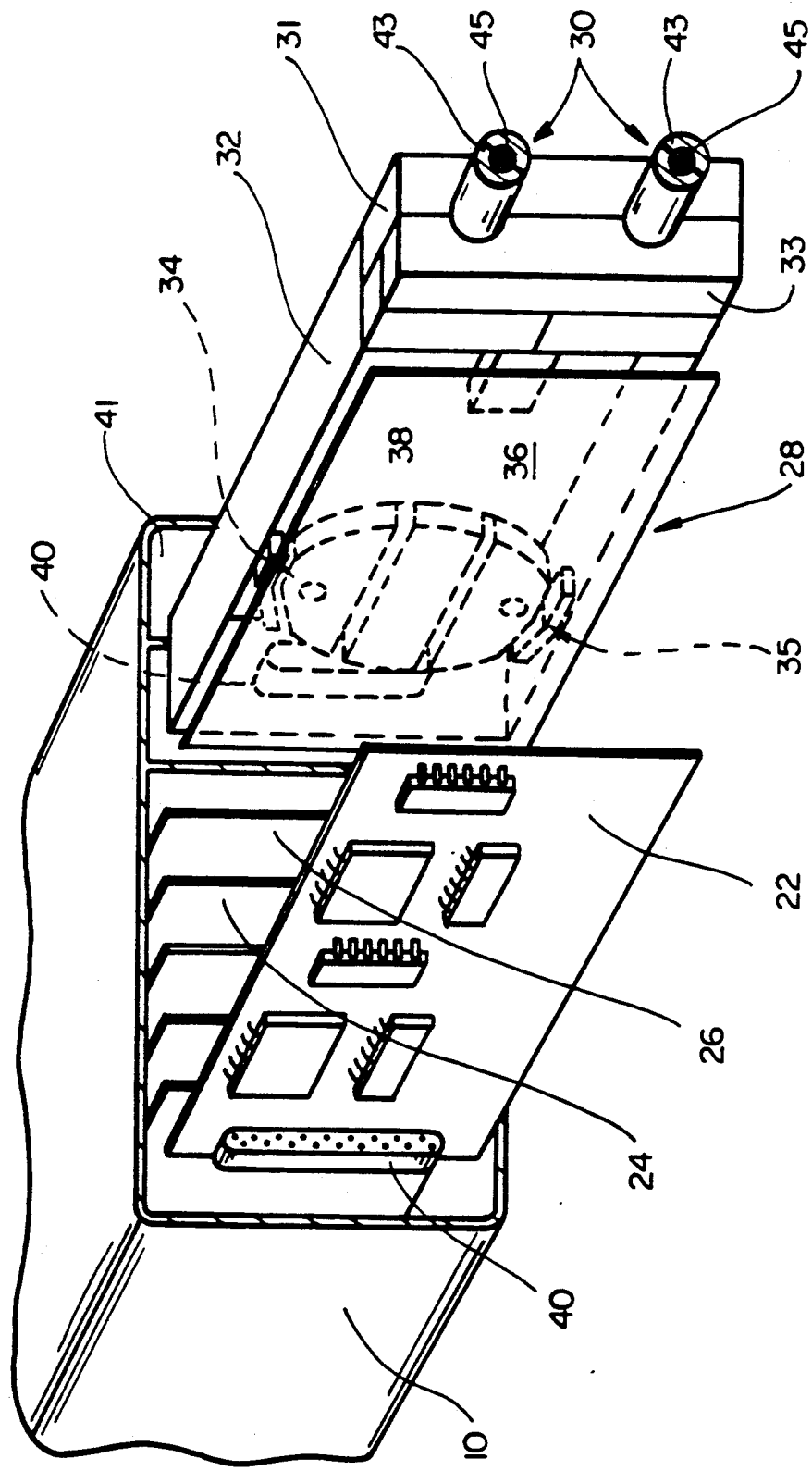
FIG_1

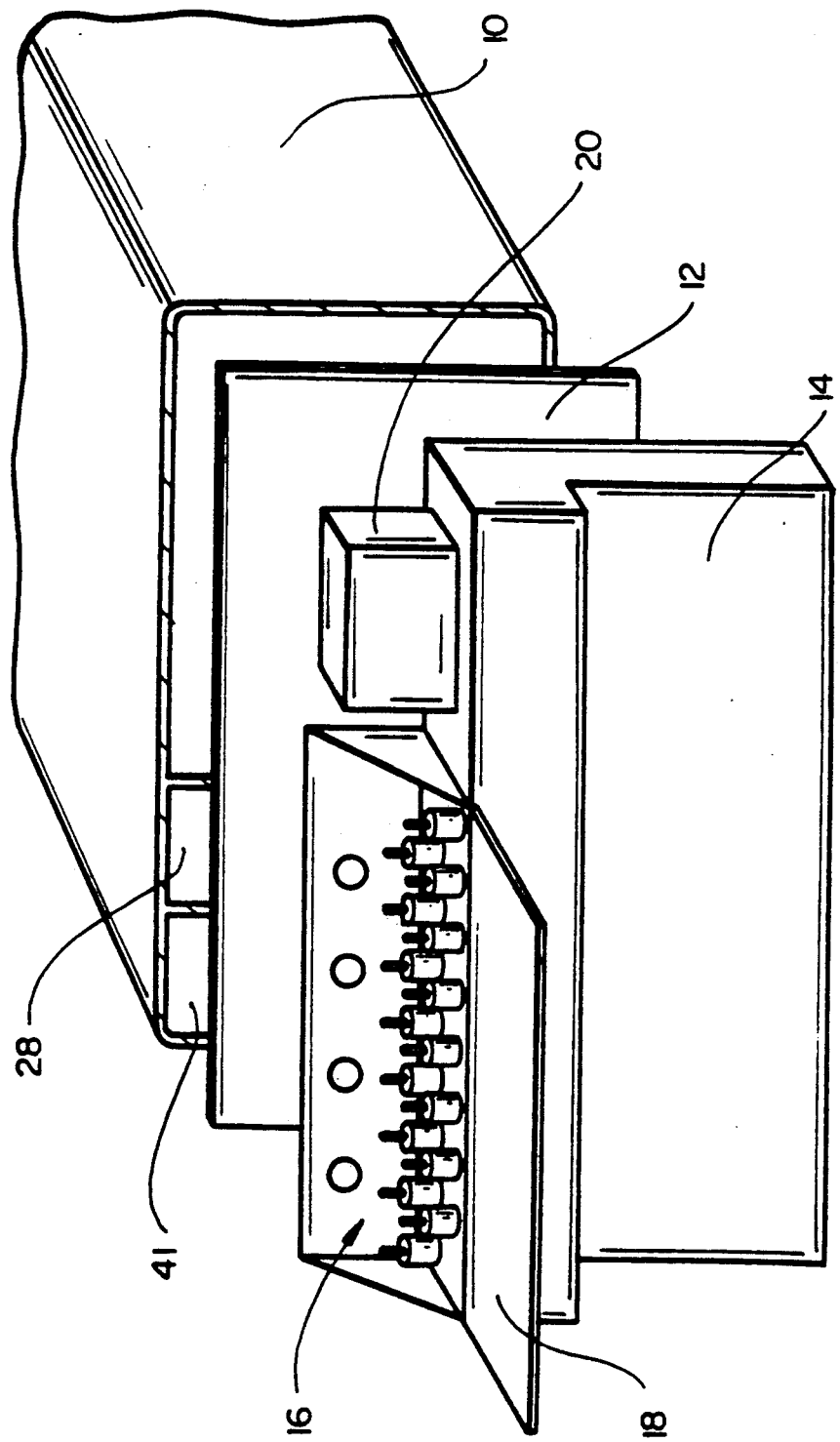
FIG_2

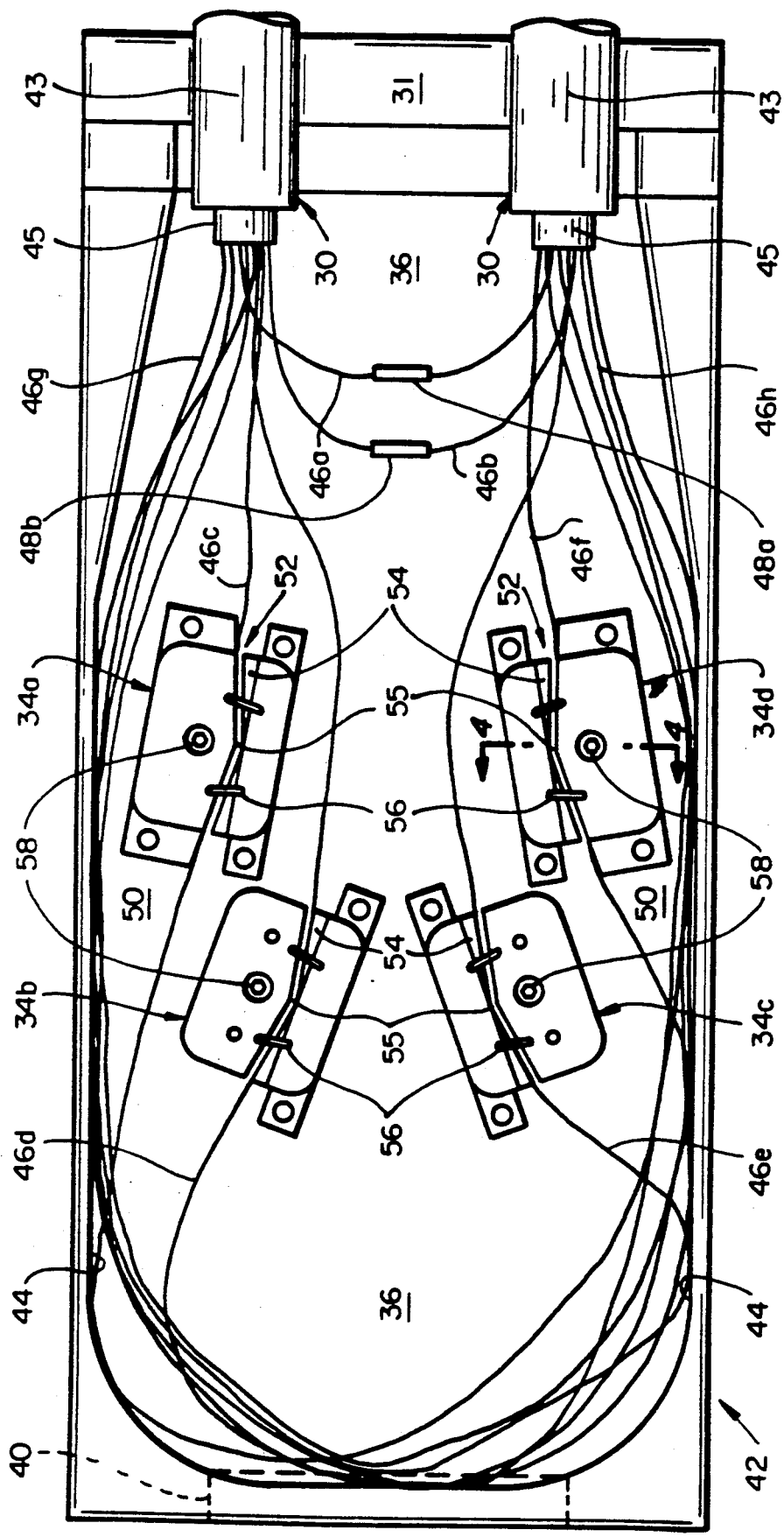
FIG_3

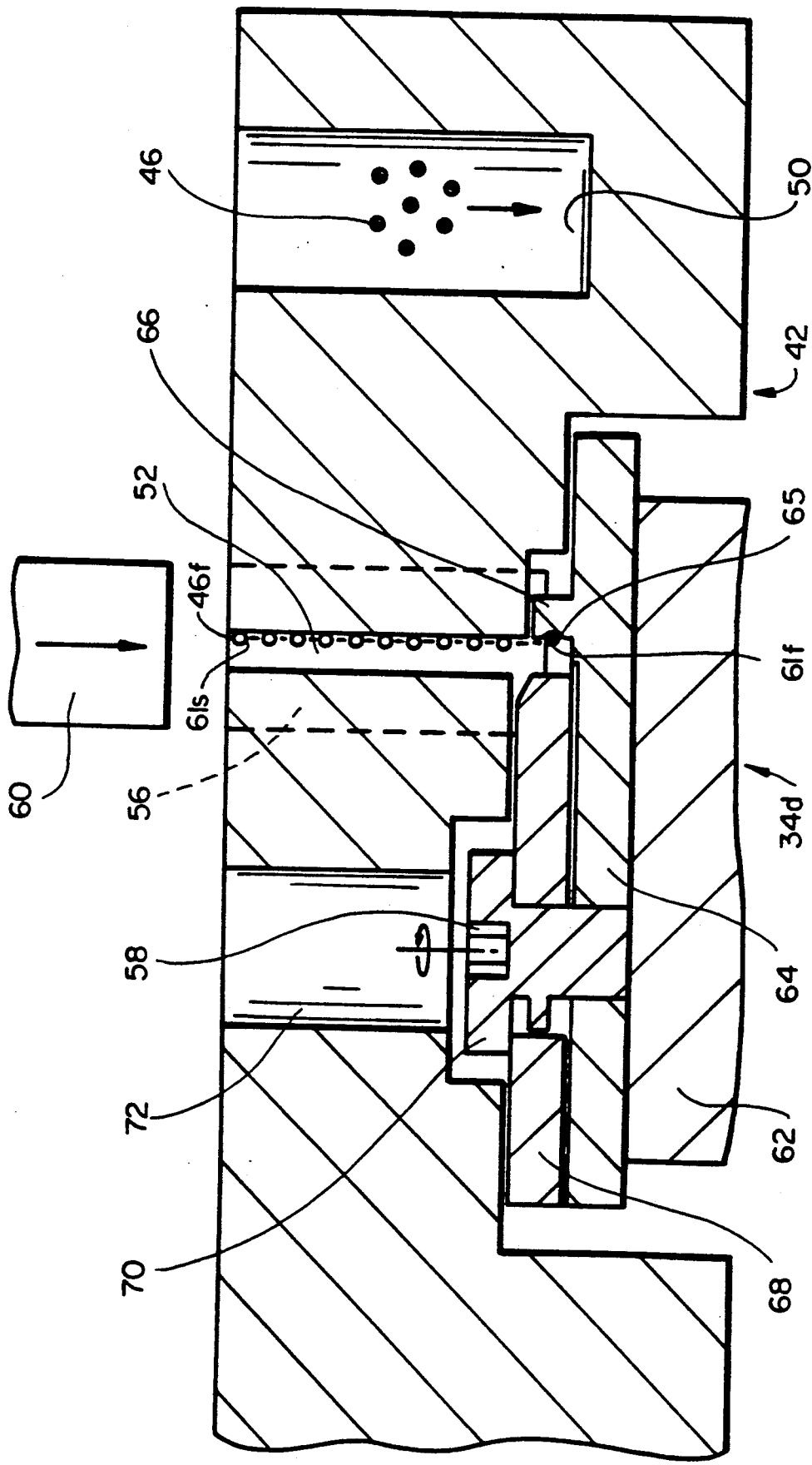
FIG_4a

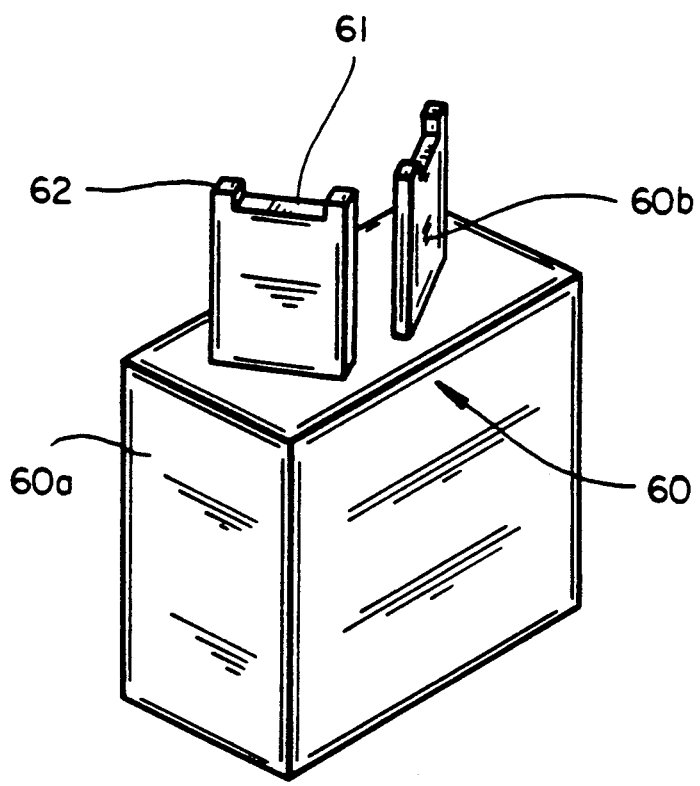
FIG_4b

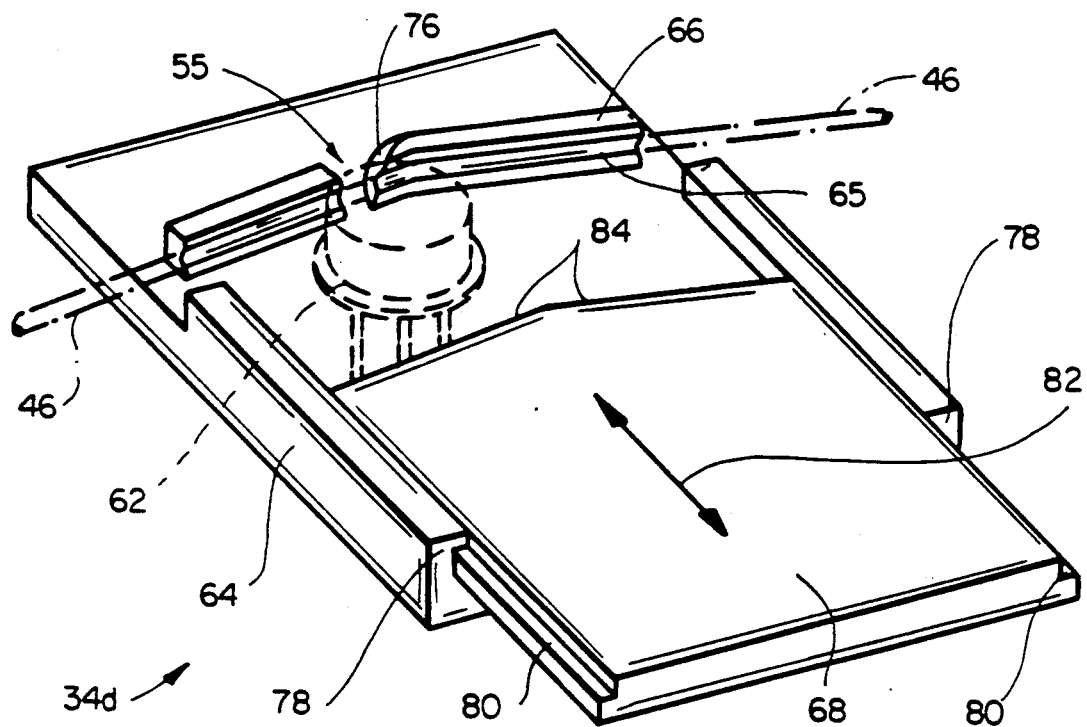
FIG_5
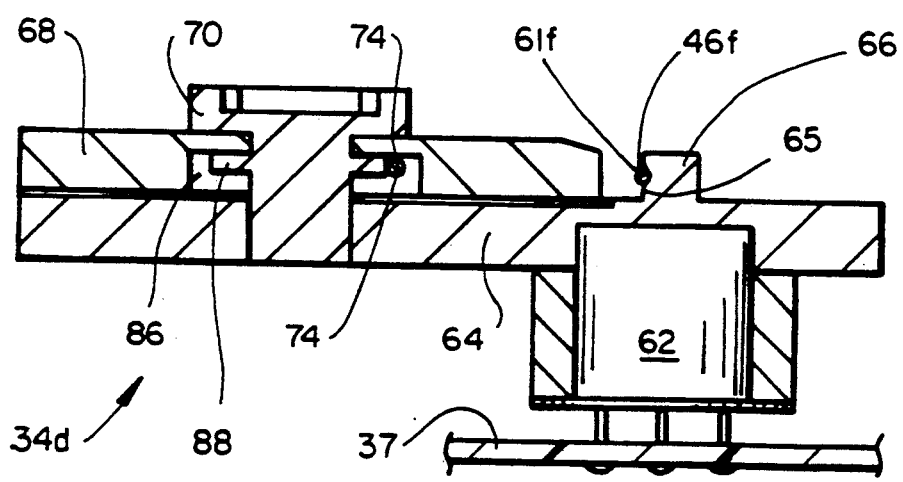
FIG_6

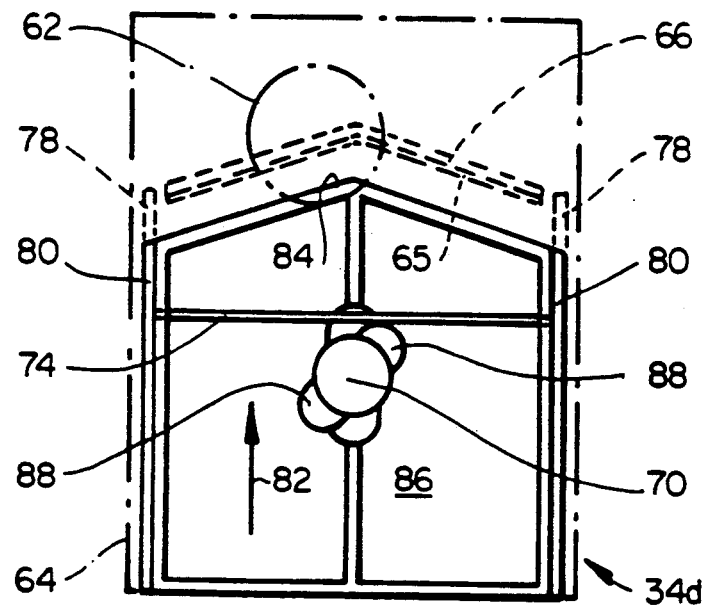
FIG_7
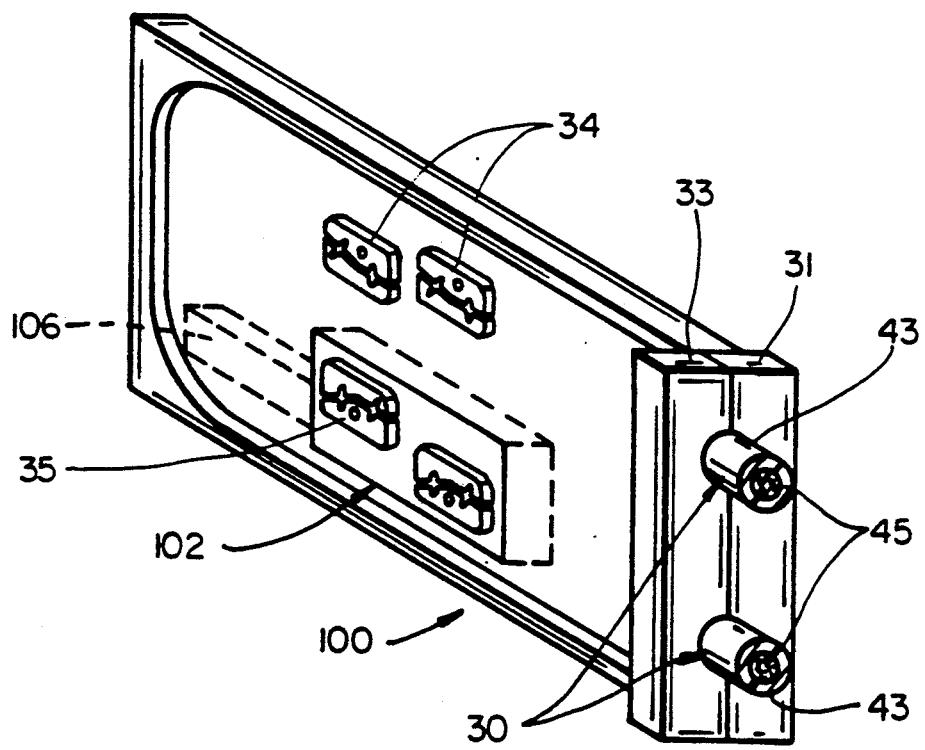
FIG_8

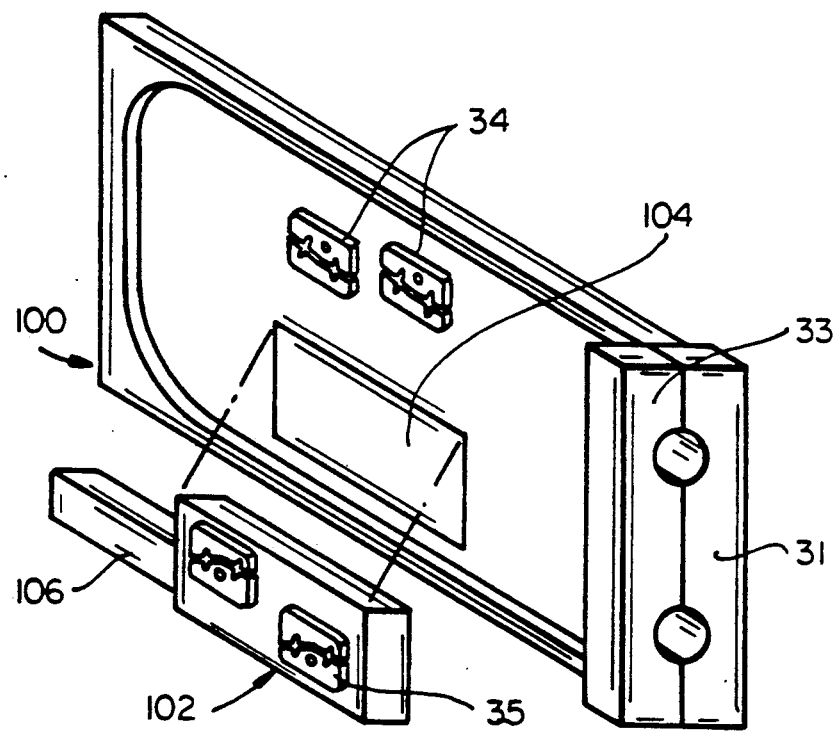
FIG_9
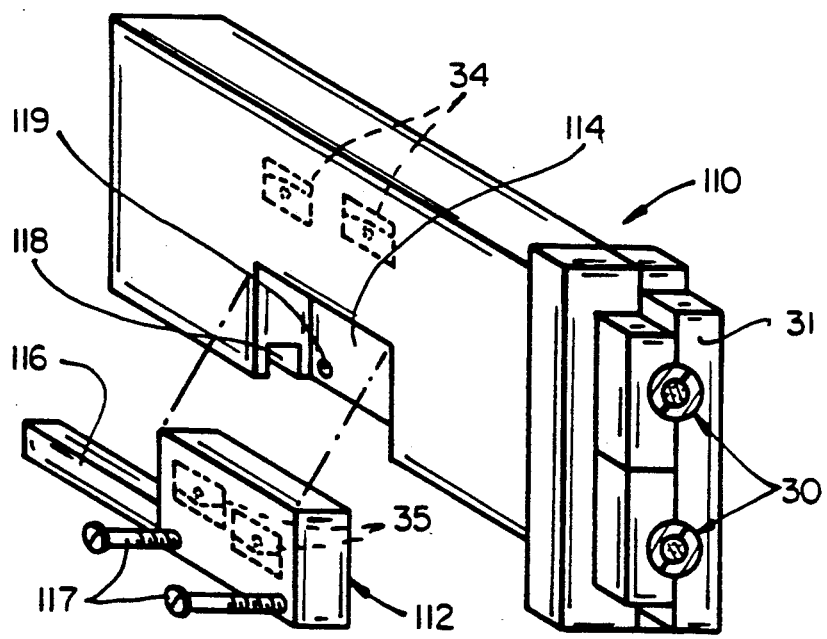
FIG_10

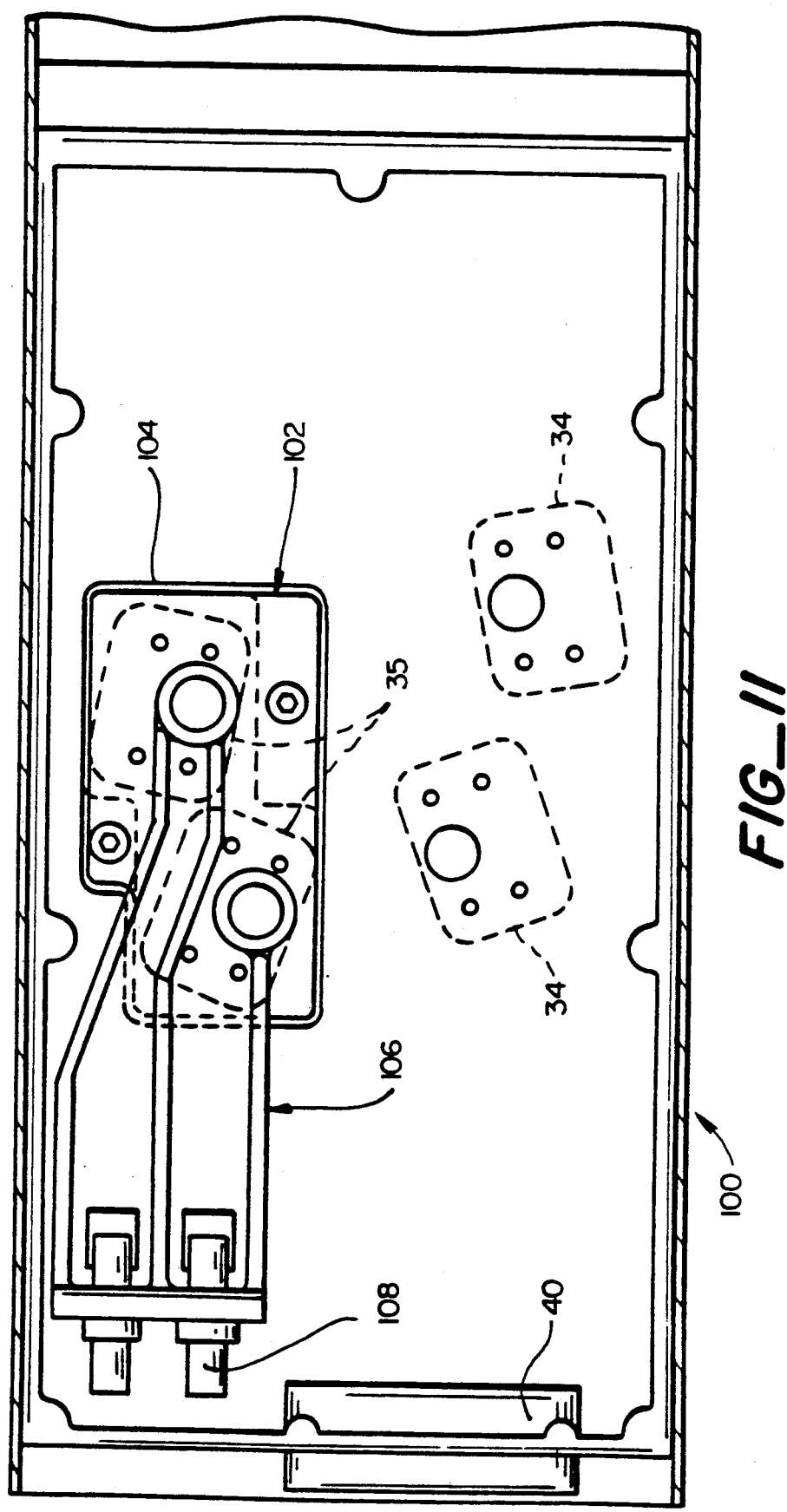

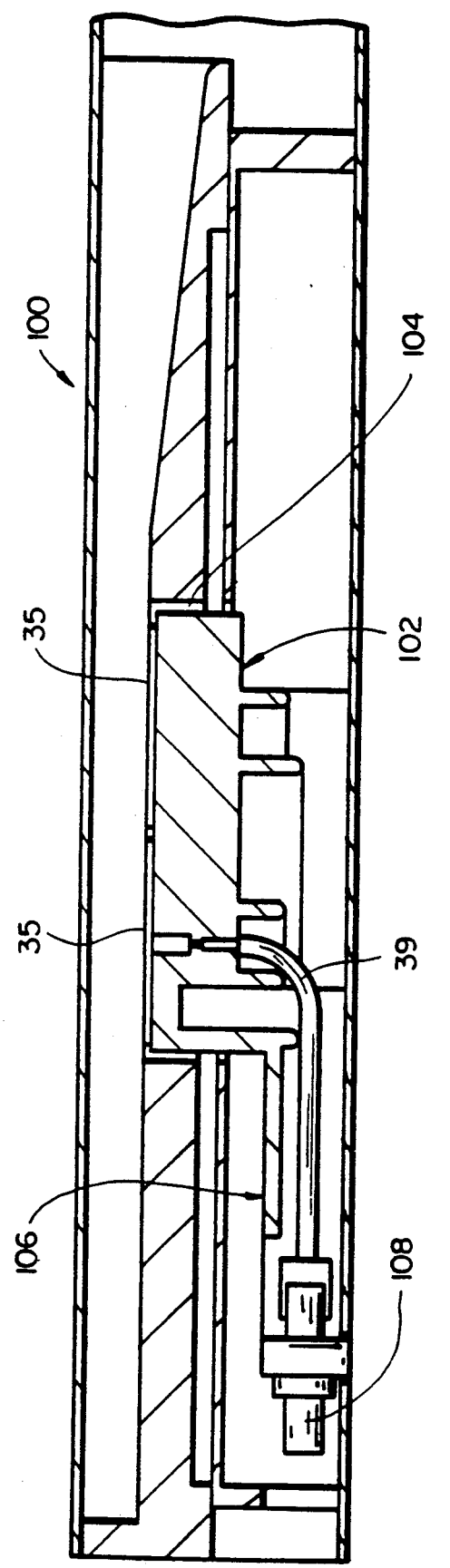
FIG_12

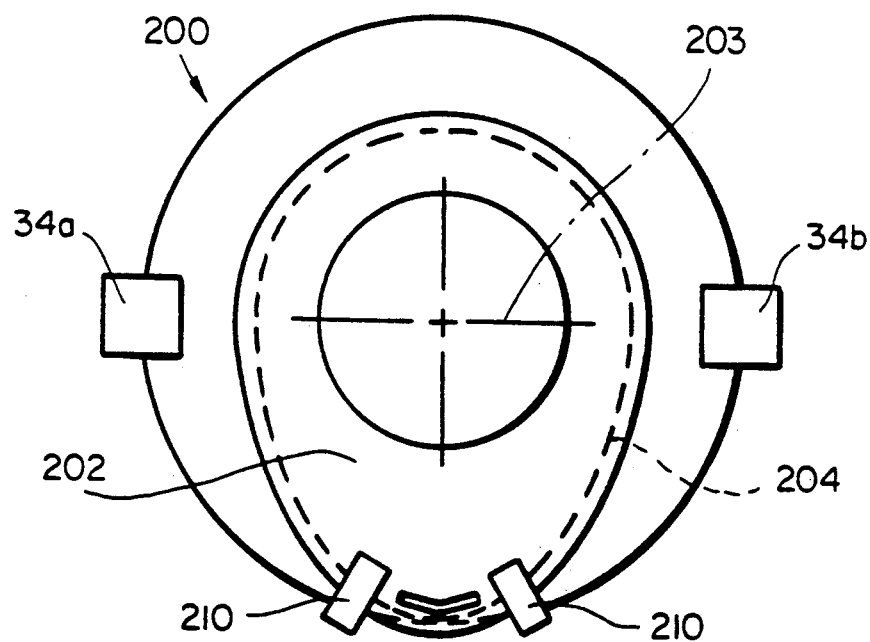
FIG_13
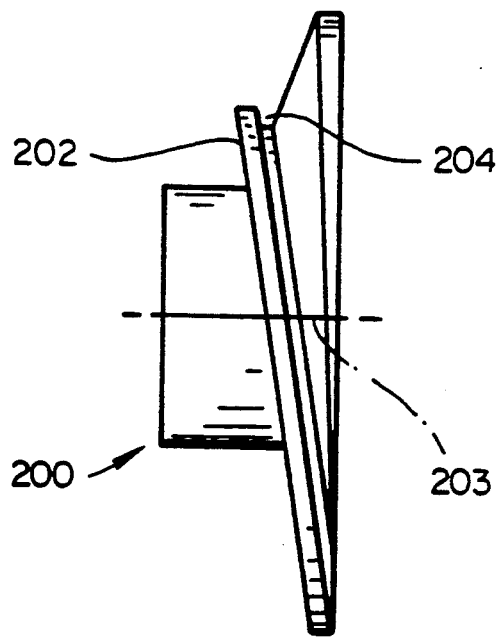
FIG_14

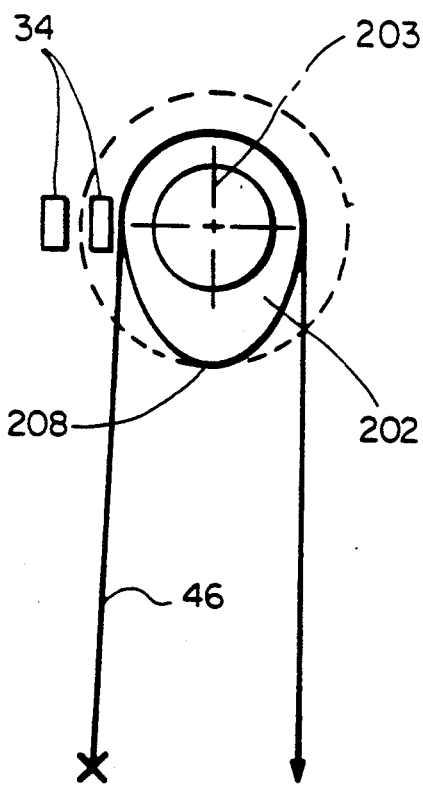
FIG_15a
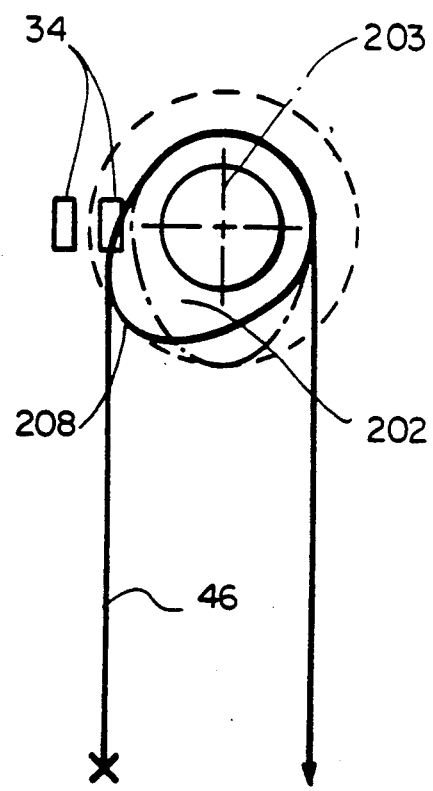
FIG_15b
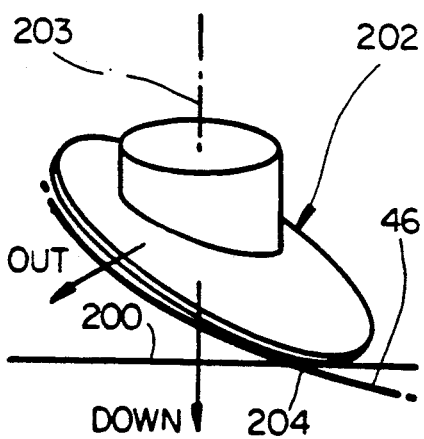
FIG_15c
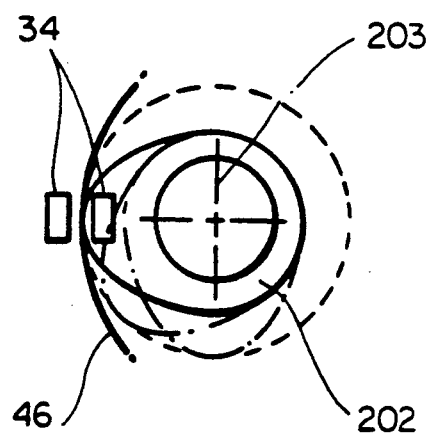
FIG_15d

OPTICAL FIBER TAP HANDLING TRAY

This application is a continuation of copending application Ser. No. 07/344,778 filed Apr. 28, 1989, now U.S Pat. No. 5,002,356 issued on Mar. 26, 1991.

FIELD OF THE INVENTION

The present invention relates to apparatus and methods for installing taps onto optical communication fibers. More particularly, the present invention relates to tapping and handling apparatus, and methods for tapping and handling optical fiber waveguides.

BACKGROUND OF THE INVENTION

Optical fiber waveguides are rapidly proliferating throughout the entirety of terrestrial based voice and data communications systems. Individual optical fibers are typically long cylindrical structures, usually having a circular cross section. In its simplest form, an optical fiber typically has two coaxial regions, a central light-guiding core and a surrounding cladding. Both are typically formed of glass fiber, although the cladding may be of other suitable material, such as plastic having a lower index of refraction than the glass core. The core may range from five to 100 microns in diameter, while the outside cladding diameter may range from 8 to 140 microns. A sheath or buffer of a different material typically surrounds the waveguide to provide optical isolation with adjacent fibers and to provide mechanical protection for the delicate, extremely small fiber waveguide. Optical fiber waveguides are typically collected together in a cable having an impervious, reinforced outer skin.

While optical fiber waveguides have been conventionally collected into cables, a need has remained for effective apparatus and methods for handling the fiber waveguides at terminal ends, such as at long distance network, outside plant or service subscriber interfaces.

It is well known that individual optical fibers are extremely small, fragile and difficult to handle, particularly in connection with splicing and in the installation of optical taps. Specialized tooling and techniques have been proposed in the prior art for handling and aligning the delicate, minute fiber waveguides for such purposes as splicing and attachment of connectors.

U.S. Pat. Nos. 4,537,466 and 4,623,156, the disclosures of which are incorporated herein by reference, describe optical fiber chucks for precise fiber positioning. U.S. Pat. No. 4,728,169, the disclosure of which is hereby incorporated by reference, describes a passive tap and fiber positioning. U.S. Pat. Nos. 4,498,732 and 4,478,486 discuss fiber organization and storage methods to prevent bending. U.S. Pat. No. 4,160,580 describes a device for terminating the end of an optical fiber with a connector. An article by Evans et al. entitled "Optical Fiber Alignment Tool" appearing in *IBM Technical Disclosure Bulletin* Vol. 22, No. 2, July 1979, pages 686–687 describes a precise Vee groove formed in the bed of a tool for aligning and holding the ends of optical fiber waveguides together for laboratory activities. Vees of soft elastomer deformably press against sections adjacent to the ends, and thereby urge the fibers into desired axial registration and alignment.

While these specialized devices have been disclosed, one unsolved problem has been to provide an effective fiber handling device and method for field use by ordinarily skilled craftsmen and installers which is repeatable, which efficiently couples a light/electricity translation element to the optical fiber waveguide, and which protects and minimizes the potential for physical damage to the optical fiber.

It has been discovered that if an optical fiber waveguide is subjected to bending, it is possible to inject light energy into the fiber waveguide or withdraw light energy from the fiber waveguide at the situs of the bend. Bends formed in optical fiber waveguides for the intended purposes of light injection or withdrawal are known as optical couplers or "taps"; and, when a coupling body having a matched index of refraction is disposed adjacent to the fiber and to a photodetector or light source, light withdrawal or injection may respectively be usefully carried out without need for invasion of the cladding material. Examples of optical fiber taps are to be found in U.S. Pat. Nos. 4,664,732; 4,586,783; 4,557,550 and 4,270,839. A particularly preferred tap is described in U.S. patent application Ser. No. 07/213,642, filed on June 30, 1988 (now abandoned), which is assigned to the assignee of the present invention. The disclosures of U.S. Pat. Nos. 4,664,732; 4,586,783 and U.S. patent application Ser. No. 07/213,642 (now abandoned), are incorporated herein by reference.

SUMMARY OF THE INVENTION WITH OBJECTS

A general object of the present invention is to provide an optical fiber waveguide tap handling tray for arrangement, tapping and handling of optical fiber waveguides in a manner and arrangements which overcome limitations and drawbacks of the prior art approaches.

A specific object of the present invention is to provide an optical fiber waveguide tap handling tray which efficiently couples light energy between the optical fiber and light/electricity translation element, either light emitter or photodetector, and which simultaneously provides positive mechanical connection and protection to the delicate, minute optical fiber waveguides.

Another specific object of the present invention is to provide an optical fiber waveguide tap handling tray which may be a unitary module adapted for plug-in attachment to an interface module containing additional functional modules.

A further specific object of the present invention is to provide an optical fiber waveguide tap handling tray which may include both narrowband and broadband taps, and in which broadband taps are comprised of assemblies including optical fiber pigtails for conducting light to a remotely located, noise and interference isolated light energy translation element. (As used herein, the term "narrowband" means data transfer speeds up to about 50 to 60 megabits per second; and, "broadband" means data transfer speeds greater than about 50 or 60 megabits per second).

One more specific object of the present invention is to provide an optical fiber waveguide tap handling tray in which taps may be installed and removed as subassemblies by the craftsman in the field so that a tap having a particularly suitable bend radius profile to provide optimized light injection or withdrawal may be selected and installed at a particular location in an optical fiber communications system.

A further object of the invention is to provide a loading mechanism which is capable of loading an intermediate section of an optical fiber into a predetermined plane of an optical tap in a gentle manner while imposing minimum stress on the optical fiber intermediate section.

In accordance with the principles of the present invention, an optical fiber waveguide tap handling tray is provided for use with a cable containing a plurality of optical fiber waveguides which are separated from the cable and exposed in a section thereof. The tap handling tray comprises a frame, a clamp for clamping the cable to the frame adjacent a section thereof so that the exposed optical fiber waveguides are thereupon physically secured to and contained within the frame, at least one optical tap secured to the frame for engaging and bending at least one of the plurality of optical fiber waveguides against an optical coupling medium having an index of refraction selected to match the index of refraction of the optical fiber so that light energy may pass through a side of the optical fiber and through the optical coupling medium, and wherein the optical tap defines an obtuse guiding angle arranged to lie in a path with which the fiber may freely be aligned within the frame after the cable has been clamped thereto.

These and other objects, advantages, aspects and features of the present invention will be more fully understood and appreciated by reference to the following detailed description of preferred embodiments presented in conjunction with the accompanying drawings.

BRIEF DESCRIPTION OF THE DRAWINGS

In the Drawings:

FIG. 1 is a front perspective view of an equipment enclosure containing one or more optical fiber tap handling trays in accordance with the principles of the present invention.

FIG. 2 is a back perspective view of the equipment enclosure depicted in FIG. 1.

FIG. 3 is a somewhat diagrammatic side view in elevation of one embodiment of an optical fiber tap handling tray in accordance with the principles of the present invention.

FIG. 4a is an enlarged, somewhat diagrammatic view in section of an optical tap portion of the FIG. 3 tray, taken along section line 4—4 in FIG. 3. A blade portion of a fiber installation tool is also illustrated in FIG. 4a.

FIG. 4b illustrates a perspective view of the tool shown in FIG. 4a.

FIG. 5 is a somewhat diagrammatic view in perspective of an optical tap geometry suitable for use with the FIG. 3 tray. The optical fiber is shown in broken line outline in this Figure.

FIG. 6 is a more detailed view of the camming mechanism of the optical tap portion shown in FIG. 4a.

FIG. 7 is a bottom plan view of the optical tap mechanism shown in FIG. 4a, with the rest of the FIG. 4a camming mechanism structure shown in phantom by broken lines.

FIG. 8 is a diagrammatic view in perspective of an alternative embodiment of an optical fiber tap handling tray in accordance with the principles of the present invention showing a broadband optical coupler assembly installed in the tray through an opening from the backside thereof.

FIG. 9 is a diagrammatic view in perspective of the FIG. 8 embodiment, showing the removable broadband optical coupler assembly removed from the tray and separately illustrated.

FIG. 10 is a diagrammatic view in perspective of another embodiment of an optical fiber tap handling tray in accordance with the principles of the present invention showing a removable broadband optical coupler assembly which may be installed in the tray via a bottom edge opening.

FIG. 11 is a diagrammatic view in side elevation of an embodiment similar to the FIG. 8 embodiment but showing greater structural detail of the removable broadband coupler assembly.

FIG. 12 is a top plan view in section of the FIG. 11 embodiment.

FIG. 13 is a top plan view of a frustoconical rotary fiber tap loader embodiment incorporating principles of the present invention.

FIG. 14 is a die view in elevation of the loader depicted in FIG. 13.

FIGS. 15a, 15b, 15c and 15d are diagrammatic views of various rotational positions of the FIG. 13 rotary loader illustrative of its operation in loading the fiber waveguide into the tap.

DETAILED DESCRIPTION OF THE PREFERRED EMBODIMENT

With reference to FIGS. 1 and 2, a subscriber interface unit (SIU) 10 is depicted. the SIU is preferably formed of a suitable material such as a large rectangular tube of extruded aluminum alloy, and it may be provided with longitudinal fins to increase heat dissipation capacity by convection to the ambient environment. The SIU 10 is intended to be ruggedized, for installation in outside plant cable vaults as well as at service subscriber equipment rooms or premises. The function of the SIU 10 is to provide an electrical or optical interface between the optical fiber waveguides and subscriber lines, whether individual tip and ring telephone service pairs or broadband data/video channels.

Referring specifically to FIG. 2, the SIU 10 is provided with a backplane 12 which enables plug-in interconnection of interface functional modules to be described in greater detail hereinafter. A weathertight read cover 14 covers and seals the backplane end of the SIU 10 against the ambient environment. A terminal block 16 includes a series of wire terminals and is provided for electrical wire interconnection with the optical fiber network at the SIU 10. The terminals are connected via the backplane 12 to the functional modules. A cover 18 encloses and seals the terminal block 16 against the environment to provide mechanical protection from disturbances within the cable vault/equipment room and some protection against the ambient environment.

A power supply/surge protection block 20 provides a source of entry of primary supply power, such as 110 volt ac line voltage, in order to supply the electrical/electronic circuitry of the functional modules within the SIU 10. The surge protection feature protects the circuitry from damage due to voltage surges, spikes or other unwanted transients present on the primary voltage supply line.

Returning to FIG. 1, it may be seen that the SIU 10 encloses a plurality of functional modules. These modules include several line cards 22 which perform digital to analog and analog to digital conversions for one or more telephone signals carried by a particular optical fiber waveguide or set thereof. In practice, each optical fiber waveguide may carry up to 200 or 300 separate subscriber voice grade service channels or paths, for example. A Test and Maintenance module 24 is provided to enable testing and maintenance procedures to be carried out. A digital central processing unit module 26 provides a central supervisor for supervising the functions carried out within the SIU 10.

FIG. 1 also illustrates an optical fiber handling tray 28 as another one of the plug-in functional modules present within the SIU 10. As with the other functional modules 22, 24 and 26, the tray 28 includes a metal frame 32 which is adapted to slide into the SIU and to plug into a backplane receptacle via a suitable backplane connector 40 as shown in FIG. 3. Longitudinal protrusions or grooves may be formed (by extrusion for example) in the SIU frame 10, and these protrusions or grooves may be used as guides by suitable longitudinal structure on the top and bottom walls of the frame 32, so that the optical fiber handling tray 28 is properly aligned as it slides into the SIU 10.

An optical fiber containing cable 30 enters and leaves the tray 28 via suitable openings provided through a block 31 and clamp 33 located at a front end of the tray, opposite from the backplane end thereof. The removable clamp 33 enables the cable 30 to be looped through and secured to the tray 28 in a sealing relation therewith at the locations of entry and exit. As perhaps best seen in the FIG. 3 embodiment, the cable 30 includes an outer cover 43 of suitable material such as flexible plastic or rubber elastomer, an interior protection sheath 45, and a plurality of optical fiber waveguides 46. The outer cover 43 and interior protective sheath 45 are stripped away in order to expose a section of the fibers 46 within the tray between the entry and exit of the cable 30. Eight such waveguides 46 are shown in FIG. 3 within the cable 30, though in practice the cable could contain fewer fibers, or it could contain as many as several hundred fibers. It has been found advantageous to provide a hermetic seal between the cable 30 and tray 28 in order to minimize intrusion of moisture into the interior of the tray 28. Suitable sealing means and techniques, such as those described in published European Patent Application, No. 0,257,999, hereby incorporated by reference, or equivalents may be employed to minimize entry of moisture into the interior spaces of the tray 28. A suitable desiccant may also be included within the tray to control humidity.

The tray 28 may be provided with a plurality of waveguide couplers or taps. A voice circuit coupler or tap 34, of the type illustrated in FIGS. 3-7, may be provided, and this tap 34 includes a light/electricity translation element 62 (either light source or photodetector) directly mounted thereon which optoelectronically interfaces an intermediate segment of the optical fiber waveguide with electronic circuitry carried on a circuit board 37 (FIG. 6) mounted to the tray 28 on the backside thereof. The circuitry on the circuit board 38 handles the signals of the light/electricity translation element 62 and interfaces the electrical representation thereof via the connection 44 to the backplane. Thus, the structure of each tap 34 may be secured to the circuit board 37 and the composite tap 34/circuit board 37 may be installed (and removed or replaced) relative to the tray 28 during service procedures as a single unit. Alternatively, because the circuit board 37 is separately attachable to the tray 28, the tap 34 can be separately removed from or installed in the tray 28 without interfering with the circuit board 37. This feature is important in order to enable the craftsman to select and install a tap 34 which has a bend radius profile that provides a predetermined amount of light energy injection or withdrawal relative to the optical fiber. Thus, the level of light required at the situs of the tray 28 for effective operations may be field selected by installation of an appropriately profiled tap 34.

Referring to FIGS. 1, 9, 11 and 12, a broadband coupler 35 enables broadband signals to be obtained from or injected into a particular optical fiber waveguide. Such signals may comprise broadband high speed digital data channels or video channels (e.g. 500 megabits per second). A difference structurally between the broadband coupler or tap 35 and the narrowband voice circuits tap 34 is that the light/electricity translation element 12 is not mounted adjacent to the tap structure 35. Rather, an optical pigtail element 106, as seen in FIGS. 11 and 12, conducts the extracted/injected light between the backplane 12 and the tap structure 35. A separate broadband plug-in module 41 interfaces a broadband light/electricity translation element with the broadband pigtail 106 via suitable optical plumbing and connectors at the backplane 12.

Referring to FIG. 1, the tray 28 preferably defines at least one region 36 in which optical splices may be located. This region 36 can be in a vicinity of a cable end of the frame or a backplane end of the frame. While it is not necessary that the cable 30 be terminated at the tray 28, if it is a cable termination location, then the optical fiber waveguides must all be spliced together in order to conduct the light energy in a series network arrangement. The splices are thicker than each fiber, and the space 36 provides a suitable location to arrange the splices and protect them from disturbance within the cable vault/equipment room operating environment. Channels 38 may be provided within the tray 28 in order to arrange and organize the optical fibers which are not being tapped at either of the taps 34 or 35.

A slightly modified tray 42 incorporating principles of the present invention is depicted in FIG. 3. In the FIG. 3 preferred embodiment, four narrowband voice grade optical taps 34a, 34b, 34c and 34d are provided in lieu of any wideband taps 35. An alternative preferred embodiment is to provide two narrowband taps on one side of the tray and two broadband taps on an opposite side of the tray. The cable 30 is shown with e.g. eight optical fiber waveguides 46a, 46b, 46c, 46d, 46e, 46f, 46g, and 46h. Fibers 46a and 46b are shown with splices 48a and 48b arranged in the space 36. Fibers 46c, 46d, 46e and 46f are respectively installed in the taps 34a, 34b, 34c and 34d in FIG. 3. An additional space 36 provides room for splices and fiber waveguides to be organized and arranged behind the taps 34 adjacent the backplane connector 40 end of the tray 42. Inside surfaces 44 of sidewalls of the tray 42 cooperate with the raised outer geometry of the taps 34a and 34d to provide a convenient peripheral guideway 50 for the segments of optical fibers not secured to any of the adjacent taps 34. The peripheral guideway 50 functions, as do the channels 38, to guide, locate, organize and protect the otherwise loose fibers 46 which may not be phsically secured to the tray by adjacent taps 34.

Means are also provided for easily and conveniently loading an intermediate segment of the optical fiber into each tap 34 so as to induce minimum stress on the fiber. Each tap 34 is preferably mounted to a bottom of substrate 152a, 152b, 152c, 152d, the substrate including a slotted, obtuse angled narrow opening or slit 52 for receiving the intermediate segment of an exposed section of optical fiber 46. One face 54 of each slit 52 oppositely facing the guideway 50 is slanted relative to the horizontal, except at a centralmost apex portion 55 of the tap 34, to facilitate guiding of the fiber waveguide 46 into the tap 34. Transverse horizontal slots 56 extend through each substrate 152a, 152b, 152c, 152d at locations straddling the slit 52. These slots 56 are provided to receive a double tined or pronged insertion tool 60 having a base 60a and first and second tines 60b, (FIGS. 4a, 4b), the tines pressing against the fiber 46f, for example, and guiding it into tap position along a locus of movement 61 from a start position 61s to a final tap position 61f in which the optical fiber 46f is nested in a groove 65 formed in a raised and angled guiding member 66 of the coupler body 64 of the tap 34d as shown in FIG. 4a. Preferably, the tines 60b and slots 56 interengage like gear teeth to guide the fiber. The tines 60b have a surface 62 which contacts an upper surface of the tap coupler body 64 (FIG. 5) when the tines 60b are interengaged with the slots 56. The surface 62 has a recess 61 formed therein which has a depth approximately equal to an outside diameter of the optical fiber 46f. Preferably the depth of the recess is less than 3 diameters of the fiber, more preferably less than 2 diameters, optimally about 1 diameter. The fiber 46f is inserted into a predetermined plane of the tap 34 by locating an intermediate section of the optical fiber in the recesses 61 of the tool 60 in a vicinity of the substrate slit 52 and subsequently interengaging or interconnecting the piece or member or tool or tine 60b with the slot 56 until the surface 62 of the tine 60b contacts an upper surface of tap coupler body 64 so as to confine parts of the intermediate section of the optical fiber in a gap formed by the surface 62 of the tool tine 60b, the recess 61 of the tool tine 60, and an upper surface of the coupler body 64. This allows the fiber to be easily loaded in the tap by then engaging closure member 68 against guiding member 66 having the groove 65 therein. Such a loading procedure imposes minimum stress on the optical fiber. The tool tine 60b may be separately provided as shown in FIG. 4b, or may be integrally formed as part of a lid for each tray.

A central opening through each tap 34 leads to a rotatable, spring biased camming mechanism 58 adapted to receive a standard tool, such as a hex wrench or screwdriver through a transverse outer opening 72. After the optical fiber 46 is nested in its final tap position 61f by use of the tool 60, a cam screw 70 of the camming mechanism 58 is rotated, and closure member 68 is moved to bias the intermediate segment of the optical fiber waveguide 46f against the grooved guiding surface 65 of the coupler guiding member 66. A leaf spring 74 shown in FIG. 7 provides a resilient bias force for returning the closure member 68 to its open position from the angled guiding surface 66 upon again rotating the camming mechanism 58.

Referring to FIG. 5, a reflector surface 76 formed at the angle apex 55 of the guiding member 66 directs light energy to and from the tapped optical fiber 46 and a receiver/transmitter element 62 disposed transverse to the optical fiber directly below the apex 55 and reflector surface 76. This particular tap arrangement is disclosed in the assignee's copending U.S. pat. application Ser. No. 07/213,642 (now abandoned), which has been incorporated by reference herein.

The coupler body 64 may be formed with sidewalls having grooves 78 which cooperate and guide tongues 80 of the member 68 along a locus of movement 82 of the closure member 68 relative to the coupler body 64.

An inner end surface 84 of the closure member 68 is congruent with the guide groove 65, so that when the closure 68 is cammed against the optical fiber 46f, for example, the optical fiber is precisely aligned and nested in the groove 65. A hollow space 86 within the closure member 68 provides room for the leaf spring 84 and cam protrusions 88 of the cam screw 70.

FIGS. 8-12 illustrate a tray 100 which is a variant of the tray 28 of FIG. 1 and the tray 42 of FIG. 3, which accommodates both narrowband taps 34 and broadband taps 35. (Common reference numerals refer to structural elements previously discussed herein.) As previously explained, the broadband taps 35 employ optical pigtails 39 which communicate light energy between the tapped optical fiber waveguide 46 and the broadband signal module 41. (See FIG. 12). In order to provide the broadband taps 35 as a single unit, a broadband subassembly 102 is provided which may be mounted to the tray 100 through the back thereof via a suitable opening 104 as shown in FIGS. 8 and 9. A pigtail shroud portion 106 of the subassembly 102 encloses and protects the optical pigtails 39 leading from the broadband couplers 35. Suitable optical connectors 108 (FIG. 12) are included within the end of the shroud portion 106 for enabling optical connection of the pigtails 39 and the backplane 12. Alternatively, the pigtails 39 are taken through the backplane 12, extended along the back side of the backplane, and brought back through the backplane to connect with a suitable broadband processing module within the SIU 10.

Alternatively a tray 110 may be provided as illustrated in FIG. 10 which includes a broadband subassembly 112 adapted for insertion into the tray 110 via a lower peripheral region 114 formed in the tray 110. Bolts 117 and bolt holes 119 are provided for releasably attaching the tap to the tray. The arrangement has the advantage that the broadband subassembly 112 may be inserted and removed from the tray 110 without distrubing or other wise moving the backside-mounted circuit board 37 serving the narrowband couplers 34. An optical pigtail shroud portion 116 of the subassembly 112 is adapted to fit inside of a channel 118 formed in the lower rear outside edge of the tray 110.

FIGS. 13, 14 and 15a-d illustrate a further embodiment of the present invention. An optical fiber handling tray 200 includes an eccentric wrapping mandrel 202 rotatable about an axis 203 and defining a fiber guide groove 204. As shown in FIG. 15a the optical fiber 46 is wrapped around the mandrel 202 in a loading position. When the mandrel has been rotated about 60 degrees clockwise from its original position, as shown in broken line in FIG. 15b, the optical fiber 46 is guided into the groove 204 and is directed toward the optical tap 34. The downwardly guiding structure of the mandrel 202 defining the groove 204 is shown illustratively in FIG. 15c. As the mandrel 202 is further rotated in a clockwise sense and the fiber 46 enters the guide groove 204, the fiber 46 is thereby directed downwardly toward the floor of the tray 200. As an eccentric tip 208 of the rotating mandrel 202 passes by the optical coupler 34, the fiber 46 is directed and forced into the groove 52 of the optical tap 34. Once the fiber 46 is thus installed in the tap 34, the camming screw 70 may then be rotated and the fiber 46 thereby secured in place. As is suggested in FIG. 13, the mandrel 202 may be rotated in a clockwise direction to load the tap 34a, and in a counterclockwise direction to load the tap 34b. One or more wipers 210 may be provided to clean the optical fiber before it is inserted into the tap. Also, the groove 204 may be provided with a coating or a liner which facilitates slidable movement of the optical fiber relative to the groove 204.

There may be several taps, e.g. at 3 o'clock, 6 o'clock, 9 o'clock and 12 o'clock, for example, along the locus of movement of the eccentric tip 206, so that selected 90 degree rotations of the mandrel 202 may load each of the taps 34 so disposed.

Having thus described presently preferred embodiments of the present invention, it will now be appreciated by those skilled in the art that many changes in construction and widely differing embodiments and applications of the invention will suggest themselves without departure from the spirit and scope of the invention. The disclosures and the description herein are intended to be illustrative and are not in any sense limiting of the invention, more preferably defined in scope by the following claims.

We claim:

1. An optical fiber waveguide tap handling tray for use with a cable containing at least one optical fiber waveguide which is separated from the cable in a section thereof, the tap handling tray comprising:

a frame having a cable end and a backplane edge, optical tap means secured to the frame for engaging and bending a segment of the separated section of the optical fiber waveguide against an optical coupling medium for passing light energy through a side of the optical fiber waveguide segment and through the optical coupling medium, the frame cable end enabling the cable to enter the tray at plural spaced apart locations so that the optical fiber waveguide section forms at least one loop within the frame, and the backplane edge enabling signal connections to be made with the optical coupling medium, the optical tap means defining an obtuse guiding angle arranged to lie in a path with which the fiber may freely be aligned within the frame after the cable has entered the tray, wherein the frame further defines an inside peripheral channel and wherein portions of the loop section of the fiber waveguide other than the segment engaged in the optical tap means lie substantially within the inside peripheral channel, wherein the optical tap means being attached to the frame at a region lying inside of the inside peripheral channel.

2. The optical fiber waveguide handling tray set forth in claim 1 wherein the cable contains a plurality of optical fiber waveguides and further comprising a plurality of optical tap means arranged to engage the plurality of optical fiber waveguides.

3. The optical fiber waveguide handling tray set forth in claim 2 wherein at least one of the plurality of optical tap means comprises a tap having a light element directly associated therewith and in direct electrical and mounting configuration with a circuit board means secured to the tray.

4. The optical fiber waveguide handling tray set forth in claim 1 wherein at least one of the plurality of optical tap means comprises a tap subassembly demountably attached to the tray.

5. The optical fiber waveguide handling tray set forth in claim 4 wherein the demountable tap subassembly includes an optical pigtail and a shroud for the pigtail, the pigtail for conducting light energy to the backplane edge of the tray.

6. The optical fiber waveguide handling tray set forth in claim 4 wherein the tray includes a central wall portion and the tap subassembly attaches to the tray via the backside thereof through an opening defined through the central wall portion.

7. The optical fiber waveguide handling tray set forth in claim 4 wherein the tap subassembly attaches to the tray via an opening defined at a peripheral region of the frame.

8. The optical fiber waveguide handling tray set forth in claim 4 wherein the optical tap means comprises a cammed closure member operable to clamp the optical fiber waveguide against the optical tap means along the obtuse angle after the waveguide has been installed in a central groove.

9. The optical fiber waveguide handling tray set forth in claim 1 further comprising eccentric rotatable fiber guiding means for guiding the optical fiber waveguide into the tap means as the fiber guiding means is rotated, the eccentric rotatable fiber guiding means comprises a mandrel defining a guiding groove which descends toward a low point located adjacent to an eccentric tip thereof, so that as the mandrel is rotated, the optical fiber waveguide is guided downwardly by the groove and into a central groove of the optical tap means, thereby to facilitate loading of the optical fiber waveguide into the optical tap means.

10. An optical fiber tray, comprising:

a plurality of taps each of which includes means for bending an intermediate section of an optical fiber within a plane in accordance with a particular bend radius profile such that light can be coupled between a core of the fiber and a light element in an amount related to the bend radius profile of the tap;

a tray substrate, the substrate including a cavity for accommodating a selected one of the taps; and means for securing the selected one of the taps within the substrate cavity so that removal and replacement thereof with another one of the taps can be done during installation of the tray;

means for removing the selected one of the taps from the substrate cavity.

11. The tray of claim 10, wherein the cavity is adjacent an edge of the substrate and forms a part of the edge.

12. The tray of claim 10, wherein the cavity is disposed within an interior region of the substrate such that it is not part of any outermost edge of the substrate.

* * * * *